(12) United States Patent
Souriau et al.

(10) Patent No.: US 8,246,184 B2
(45) Date of Patent: Aug. 21, 2012

(54) PRODUCTION OF CAVITIES THAT CAN BE FILLED WITH A FLUID MATERIAL IN AN OPTICAL MICROTECHNOLOGICAL COMPONENT

(75) Inventors: Jean-Charles Souriau, Saint-Egrève (FR); Nicolas Sillon, Fontaine (FR); Jean-Pierre Joly, Saint-Egreve (FR)

(73) Assignee: Commissariat a l'Energie Atomique, Paris (FR)

( * ) Notice: Subject to any disclaimer, the term of this patent is extended or adjusted under 35 U.S.C. 154(b) by 923 days.

(21) Appl. No.: 12/162,841

(22) PCT Filed: Feb. 6, 2007

(86) PCT No.: PCT/EP2007/051109
§ 371 (c)(1),
(2), (4) Date: Sep. 29, 2008

(87) PCT Pub. No.: WO2007/090828
PCT Pub. Date: Aug. 16, 2007

(65) Prior Publication Data
US 2009/0027767 A1    Jan. 29, 2009

(30) Foreign Application Priority Data
Feb. 9, 2006   (FR) .................................. 06 50466

(51) Int. Cl.
*G02B 27/00* (2006.01)
(52) U.S. Cl. .......................................... 359/614; 216/24
(58) Field of Classification Search .................. None
See application file for complete search history.

(56) References Cited

U.S. PATENT DOCUMENTS

| 3,863,249 | A | 1/1975 | Olah |
| 3,978,580 | A | 9/1976 | Leupp et al. |
| 4,989,226 | A | 1/1991 | Woodbury et al. |
| 5,417,801 | A | 5/1995 | Bol et al. |
| 5,838,414 | A | 11/1998 | Lee |
| 6,063,653 | A | 5/2000 | Lin et al. |
| 6,154,267 | A * | 11/2000 | Kondo et al. ................. 349/156 |
| 6,947,202 | B2 | 9/2005 | Liang et al. |
| 6,958,207 | B1 | 10/2005 | Khusnatdinov et al. |
| 7,136,216 | B1 | 11/2006 | Daniel et al. |
| 2003/0076609 | A1 | 4/2003 | Kawase |
| 2004/0029303 | A1 | 2/2004 | Hart et al. |
| 2004/0161201 | A1 | 8/2004 | Souriau |

(Continued)

FOREIGN PATENT DOCUMENTS

CH    591 090 A5    9/1977
(Continued)

OTHER PUBLICATIONS

French Search Report Sep. 13, 2006.
(Continued)

*Primary Examiner* — Arnel C Lavarias
(74) *Attorney, Agent, or Firm* — Pearne & Gordon LLP

(57) ABSTRACT

A novel method makes it possible to form cavities intended to contain a liquid with determined optical properties within a film for optical use. The walls (38) of the cavities (40) are formed by plasma etching of a layer of transparent or light absorbent material (30, 34) transferred onto a microtechnological substrate, the walls (38) having a structured profile in order to limit the parasitic phenomena of light diffusion and diffraction.

8 Claims, 6 Drawing Sheets

U.S. PATENT DOCUMENTS

| | | |
|---|---|---|
| 2004/0165252 A1 | 8/2004 | Liang et al. |
| 2005/0275072 A1 | 12/2005 | Haluzak et al. |
| 2006/0006336 A1 | 1/2006 | Cano et al. |
| 2006/0275711 A1 | 12/2006 | Fu et al. |
| 2007/0029277 A1 | 2/2007 | Jacobowitz et al. |
| 2008/0037104 A1 | 2/2008 | Hagood et al. |
| 2008/0123045 A1 | 5/2008 | Jeng et al. |
| 2008/0212017 A1 | 9/2008 | Ballet et al. |
| 2008/0212023 A1 | 9/2008 | Bovet et al. |
| 2009/0027767 A1 | 1/2009 | Souriau et al. |
| 2009/0246546 A1 | 10/2009 | Keppner et al. |
| 2009/0316110 A1 | 12/2009 | Cano et al. |
| 2010/0014036 A1 | 1/2010 | Caplet |
| 2012/0012960 A1 * | 1/2012 | Yang et al. .................. 257/432 |

FOREIGN PATENT DOCUMENTS

| | | | |
|---|---|---|---|
| EP | 0 782 037 A1 | | 7/1997 |
| EP | 0 977 076 A2 | | 2/2000 |
| EP | 1 672 394 A1 | | 6/2006 |
| EP | 1 722 424 A1 | | 11/2006 |
| EP | 1 791 797 A2 | | 5/2007 |
| FR | 2 872 589 A1 | | 1/2006 |
| FR | 2 879 757 A1 | | 6/2006 |
| FR | 2 888 948 A1 | | 1/2007 |
| FR | 2 888 953 A1 | | 1/2007 |
| FR | 2 897 164 A1 | | 8/2007 |
| GB | 2 435 717 A | | 9/2007 |
| JP | 06301015 A | * | 10/1994 |
| WO | 99/45143 A2 | | 9/1999 |
| WO | 02/065215 A2 | | 8/2002 |
| WO | 02/088671 A1 | | 11/2002 |
| WO | 03/021346 A1 | | 3/2003 |
| WO | 2006052763 A2 | | 5/2006 |
| WO | 2006067650 A1 | | 6/2006 |
| WO | 20061067309 A1 | | 6/2006 |
| WO | 2006116616 A2 | | 11/2006 |
| WO | 2007/090828 A1 | | 8/2007 |
| WO | 2007141525 A1 | | 12/2007 |
| WO | 2010003821 A2 | | 1/2010 |

OTHER PUBLICATIONS

PCT Search Report Apr. 26, 2007.

U.S. Appl. No. 12/502,061, Publication No. US 2010-0014036 published on Jan. 21, 2010.

U.S. Appl. No. 12/622,399, Publication No. US 2010-0133727 Published on Jun. 3, 2010.

Kuo et al; "Monolithic integration of well-ordered nanoporous structures in the microfluidic channels for bioseparation", ScienceDirect, Journal of Chromatography A, 1162 (2007) pp. 175-179.

Cheylan et al; "Optical study of plyner infiltration into porous Si based structures", Proceedings of SPIEE, May 2007, vol. 6593, pp. 1-11.

Nunc et al; Tapes, Lids and Mats, Announcement Nunc International, Jan. 2006 pp. 1-4.

Langlet et al; "Aerosol-gel deposition of photofurable ORMOSIL films doped with a terbium complex", Optical Materials, 25 (2004) pp. 179-184.

Nishijima et al; "Inverse silica opal photonic crystals for optical sensing applications", Optics Express, vol. 15, No. 20, Oct. 1, 2007, pp. 12979-12988.

Yang et al; "Opal Circuits of Light-Planarized Microphotonic Crystal Chips" Advanced Functional Materials, Jun. 2002, vol. 12, No. 6+7, pp. 425-431.

Liger et al; "Robust Parylene-To-Silicon Mechanical Anchoring" MEMS-03, IEEE, Micro Electro mechanical Systems, the Sixteenth Annual International Conference, Jan. 19-23, 2003, pp. 602-605.

* cited by examiner

PRODUCTION OF CAVITIES THAT CAN BE FILLED WITH A FLUID MATERIAL IN AN OPTICAL MICROTECHNOLOGICAL COMPONENT

TECHNICAL FIELD

The invention relates to the manufacture of films containing cavities, of depth typically less than 100 µm, separated by walls of low thickness compared to their height, typically less than 2 µm, into which a functional fluid may be introduced. A particular application concerns "optical" devices where the substrate is transparent and the functional fluid has optical qualities, for example a photosensitive liquid, a liquid of predefined optical index, liquid crystals, etc.

More generally, the invention relates to a microtechnological method for producing cavities with concave or rounded walls, and to the devices thereby obtained.

STATE OF THE PRIOR ART

In the 1990s, the incorporation of photochromic molecules in spectacle lenses underwent considerable expansion. The glasses thereby obtained have the property of becoming darker under the action of the ultraviolet (UV) rays that reach them. The photochromism of organic glasses is obtained by the introduction into the material of photosensitive components which, under the action of specific UV radiation, undergo a change in their structure that modifies their visible light absorption properties. Several families of molecules are used, such as oxazines, pyranes or fulgides, and the structural modifications undergone by such molecules may be of several types (particularly: breakages and/or formation of bonds, cis/trans isomerisations, etc.). For all these modifications, the transition times are quite long, and it is necessary to measure several tens of seconds to activate the molecules and several hundreds of seconds to deactivate them; these time periods do not at present assure maximum comfort and optical security.

To improve these glasses, manufacturers are therefore looking at other photochromic materials, and in particular materials in liquid phase, which would significantly reduce the transition times. However, the use of materials in fluidic state necessitates a fluid leak tight maintaining structure, said structure comprising walls (either spacers or solid walls) defining cavities, sealed or communicating.

In addition, the optical properties have to be optimised in each of the components and for the whole assembly. However, the walls can create optical perturbations such as light diffusion and/or diffraction. It would be desirable to manufacture walls having an optical index as close as possible to that of the fluid filling the cavities: a first immediate solution for those skilled in the art is to manufacture walls with a photosensitive resin. Nevertheless, at present, no commercially available resins have been identified that are capable of meeting all the above mentioned conditions.

The problem is therefore posed of forming suitable walls so as to limit these perturbations and in particular to ensure that they are not visible to the eye and have optical properties limiting the diffusion and/or diffraction phenomena of the visible light passing through the structures.

DESCRIPTION OF THE INVENTION

The invention proposes, among other advantages, providing a manufacturing method enabling a film to be formed comprising cavities in which the walls do not, or hardly, reduce the optical qualities of the film and a fluid contained in the cavities.

More generally, the method according to the invention makes it possible to manufacture on a substrate walls of cavities in which the height (of cavity, perpendicular to the substrate) over thickness (of wall, parallel to the substrate) ratio is high, and the shape of which has a controlled concavity. In particular, for a rounded wall, of height H, of thickness l at its ends and e in its centre, the following ratios are recommended: $2 \leq H/l \leq 10$ and $l/10 \leq e \leq l/2$. More generally, the deflection of the concavity is around a quarter of the thickness of the wall.

According to the invention, the walls are formed by plasma etching of a material, made available in the form of stacked structure, through a mask known as "thin film". This method makes it possible to open up a wide choice of materials to form the walls, while at the same time assuring the production of patterns of small size and of sufficient height. Moreover, this type of etching, although anisotropic, makes it possible to round off the edges of the etched patterns, and therefore to form walls, the optical properties of which are optimised.

The walls may be formed within a homogeneous layer of material, in which case the etching is stopped once the depth of cavity is attained, in such a way that a layer of material having convex cavities is obtained. Advantageously, the layer of material is transparent or opaque to the radiation chosen for the future use of the film, and the walls of the cavities form a network, if necessary not sealed, of height of around 5 to 30 µm.

The walls may also entirely cross through a layer of material, for example transparent or light absorbing, or more generally the interesting radiation, deposited on a support. Advantageously, the support, transparent, is coated with a stop layer so that the plasma etching is stopped at this level. The stop layer is advantageously of a thickness from 10 to 100 nm; it may or not be transparent. This stop layer may preferably then be etched to lay bare the support at the cavity base and optimise the optical properties. The depth of the cavities, which may be separated from each other by walls forming a closed network or communicate partially with each other by walls in the form of spacer elements, is then equal to the sum of the thicknesses of the layer of plasma etched material and the stop layer.

Once a stacked structure provided with optically optimised projections has been obtained, the cavities are filled with suitable fluid before being sealed by deposition of a film on the furthest part of the projections.

In order to facilitate the etching method, the support of the device is made integral with a rigid substrate, preferentially in material commonly used in microelectronics such as semi-conductors (particularly silicon) or glasses. The etching is preferably carried out through a thin layer mask, for example formed by deposition of a thin masking film, coating with a resin, exposure and development of the resin, then etching of the masking layer.

The invention also relates to a device or film thereby obtained, the optical properties of which are advantageous.

BRIEF DESCRIPTION OF DRAWINGS

Other characteristics and advantages of the invention will become clear at the reading the description provided hereafter and by referring to the appended figures, given solely by way of indication and in no way limiting.

DETAILED DESCRIPTION OF SPECIFIC EMBODIMENTS

Figure 1A:
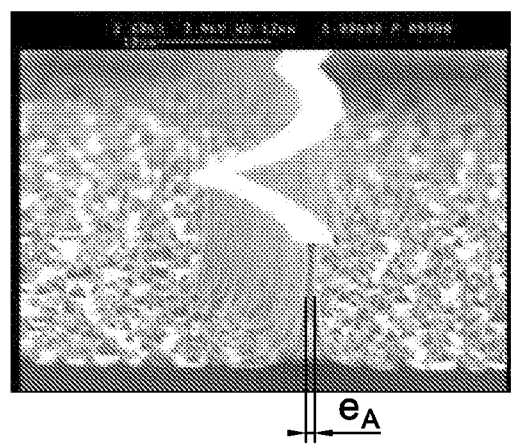
FIGS. 1A to 1C show different wall profiles formed with different etching parameters.

Although previously presented for an application to spectacle glasses, the method according to the invention is not restricted to this. In particular, the devices described hereafter may be passive polarising films, viewing screens based on liquid crystals, screens using a liquid such as the technology known as "electronic ink", or any other film or layer comprising a plurality of cavities, communicating with each other or not, filled with a fluid of determined optical property as a function of the targeted application, and in which the walls of the cavities should not degrade the optical qualities of the layer.

The film according to the invention, advantageously transparent and comprising cavities in which it is possible to trap a photochromic liquid, may thereby be transferred onto a spectacle glass or any other support, according to a known method such as bonding. In the method and the device according to the invention, the cavity walls are formed in a selected material and on a substrate, advantageously transparent; a second substrate is intended to cover the walls, so as to form cavities, communicating with each other or not, which can contain in a leak tight manner a fluid of optical qualities, for example a photosensitive or heat sensitive fluid or even a liquid of precise optical index. It is moreover possible that cavities not communicating with each other contain different fluids, such as for example liquids in which the index differs.

In fact, depending on the envisaged application, it may be interesting to have a considerable thickness of the functional fluid, for example to absorb as much light as possible in the case of photochromic material. However, the greater the depth of the cavities, the more the technological formation of their walls poses problems, and necessitates a compromise with their thickness. However, by way of example, the walls can have heights of several microns (typically 5 to 20 µm), and it is desirable, in order to minimise the parasitic optical phenomena that they generate, that their thickness is low, of the order of the micron.

According to the invention, the walls are etched by plasma etching of the layer, or the stacking of layers, of material making up the wall. This method makes it possible to form walls of the above mentioned height and of thickness less than 2 µm. Moreover, most polymers are etched by plasma methods with oxygen; more generally, this type of etching is suited to most materials considered for the manufacture of the walls.

In addition, although anisotropic, the plasma etching enables a profile rounded towards the interior of walls to be obtained. Indeed, a chemical reaction between the ionised species and/or a bombardment of ionised species bouncing off the base of the cavity and which then strike the walls (substantially orthogonal to the base) with a low incidence angle leads to a local thinning of the wall. This effect, normally considered as a drawback, is sought in the present invention: a slightly rounded shape reduces the phenomena of optical diffraction. In particular, the walls are biconcave, which enables moreover a thinning of the wall at the level of the deflection, for example in its centre, compared to the end parts.

In addition, according to the invention, it is possible to control the concavity resulting from the etching. For example, the profile of the walls in a RIE (Reactive Ion Etching) etching equipment may be controlled in several ways:

by modifying the pressure of the gases in the etching chamber, a high pressure favouring isotropy whereas a low pressure favours anisotropy;

by modifying the polarisation of the substrate and consequently the acceleration of the ions, a high voltage increasing the mechanical effect of the etching and therefore the anisotropy.

Figure 1B:
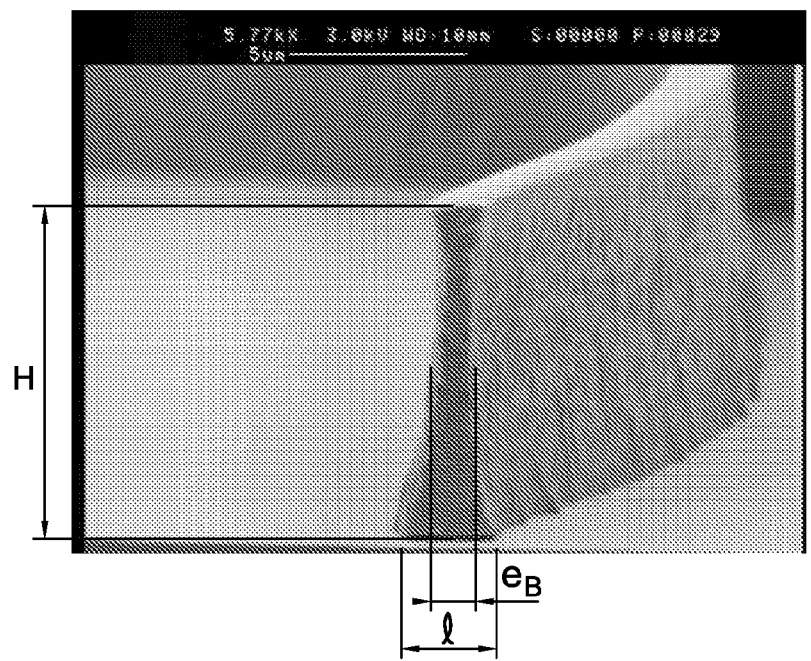
Figure 1C:
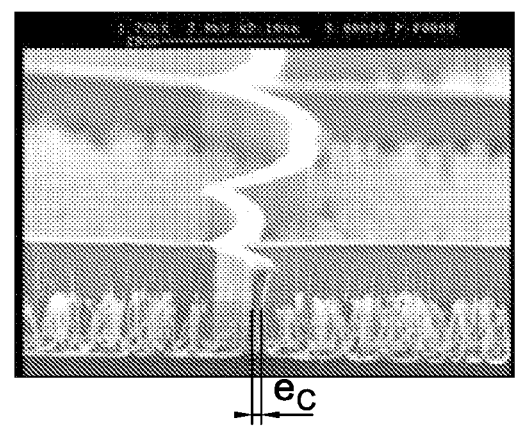

For example, in FIG. 1 are illustrated three profiles of walls obtained by "Nextral 330" RIE etching for a mask of same 4 µm width respectively at 100 mTorr (FIG. 1A), 50 mTorr (FIG. 1B) and 10 mTorr (FIG. 1C) of oxygen at 350 mW. The deflection is localised at different heights, and the thickness of the walls varies there according to the pressure conditions: $e_A < 1$ µm, $e_B \approx 1$ µm and $e_C \approx 2$ µm.

More generally, for a wall height H, a thickness l at the ends and e at the level of the deflection, the etching parameters according to the invention are chosen to obtain:

$$2 \leq \frac{H}{l} \leq 10 \text{ et } \frac{l}{10} \leq e \leq \frac{l}{2}.$$

The plasma etching is carried out through a mask known as "thin film" deposited beforehand on the layer of material making up the wall. The mask is manufactured preferably by deposition of a material selective to the plasma etching, lithography and etching.

In particular, as illustrated in FIG. 2, the preferred embodiment of the mask comprises the deposition, on a support 1, of a masking layer 2 for the etching, obtained for example by sputtering or evaporation, which is composed of a selective material in comparison to the plasma etching of the walls; for example, it is a metal (Al, Ti, Cr, etc.) or an alloy (Al/Si, Al/Cu, etc.) or a ceramic (Cr/SiO, etc.) or a transparent layer in $SiO_2$, $SiO_x$, SiOC, SiN or ITO, the thickness of which is typically between 0.1 µm and 2 µm.

Figure 2A:
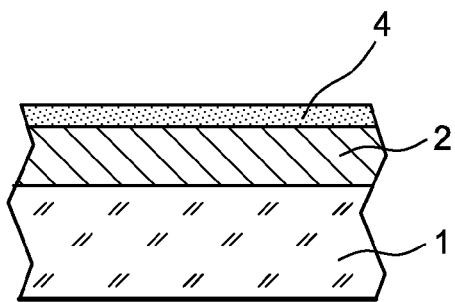
FIGS. 2A to 2C illustrate a preferred method of forming a mask according to the invention.

A photosensitive resin 4, for example of the type used in microelectronics or in flat screen technology, is then deposited: FIG. 2A. This resin is exposed through a mask representing the walls by a lithography tool, such as photosensitisation.

Figure 2B:
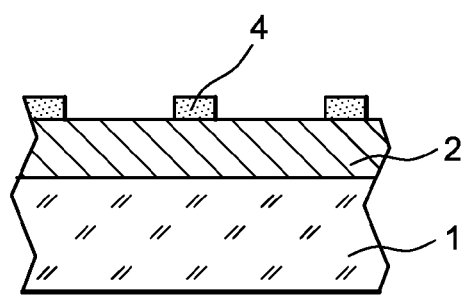
Figure 2C:
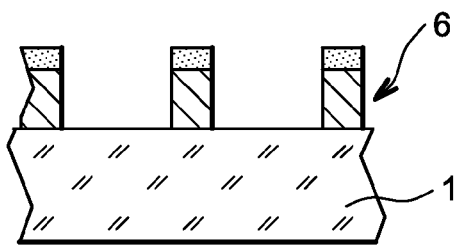

A development of the resin 4 is then carried out according to the techniques typically used in microelectronics or in flat screen technology: FIG. 2B. The part of the masking layer 2 not protected by the resin 4 is then etched, by plasma etching or chemical etching, dry or wet, to obtain the mask 6: FIG. 2C.

It should be noted that the width of the mask is a parameter to be considered with a view to obtaining a wall of given dimensions due to the fact of the lateral etching underneath the mask enabling the formation of the concavity. Thus, to obtain a wall 2 µm wide at the summit, a mask 4 µm wide may be used; the optimisation of the relative dimensions depend on the materials, the etching, etc.

According to a first embodiment illustrated in FIG. 3, the cavities of the device according to the invention are manufactured within a homogeneous layer of material, in other words that the base of the cavity and its walls form part of a same structural element (the structure only comprises this layer for example). The material is selected for its optical qualities, and in particular it may be transparent.

It is normal that the material 10 composing the film is not particularly suited due to its thickness and/or its flexibility for the envisaged etching methods: advantageously, in order to facilitate the manipulation of the film and the formation of the pattern and the etching, the layer of material 10 is secured to a support 12 that may be treated by lithography and dry etching equipment in order to ensure the whole has a sufficient thickness and rigidity. The support 12 may thus be in glass, in silicon, in quartz, in a polymer, etc. The assembly may be carried out for example by bonding (FIG. 3A); the bonding then has a sufficient mechanical strength for the subsequent technological steps, while at the same time remaining compatible with an easy dismantling.

A mask 6 is then deposited on the surface of the film layer 10 opposite the substrate 12; preferably, the mask 6 is formed according to the method described in relation to FIG. 2.

The transparent film 10 is then etched through the mask 6 over a determined depth. The etching used in this step of FIG. 3B may be a conventional RIE plasma or high density etching with $O_2$ mixed or not with a $SF_6$ and/or $CHF_3$ type fluorinated gas under suitable conditions to have a slight isotropy.

The etching is stopped once the depth is attained, in other words for example once the walls 14 of 10 μm are obtained. As disclosed above, the determination of the different parameters (duration, plasma pressure, type of gases, etc.) enables the desired profile to be obtained.

Figure 3A:
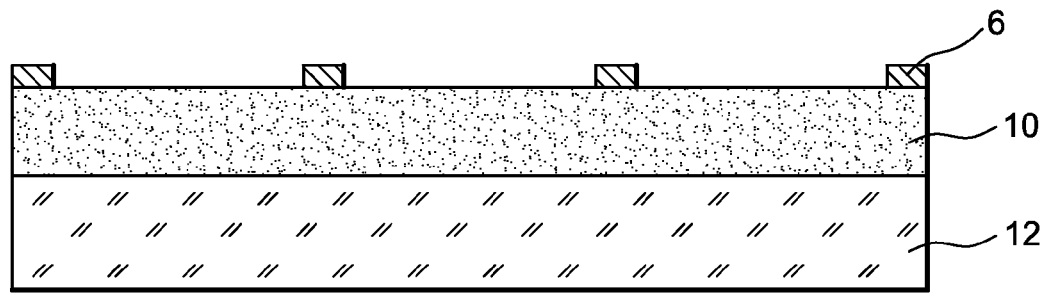
FIGS. 3A to 3D show a first embodiment of the method according to the invention.
Figure 3B:
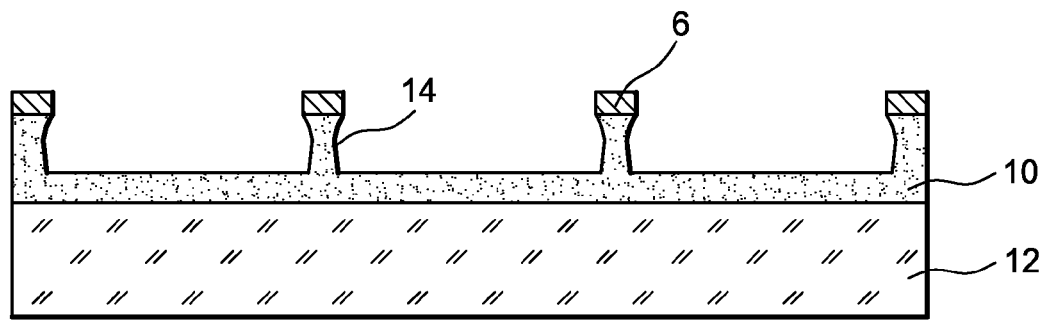
Figure 3C:
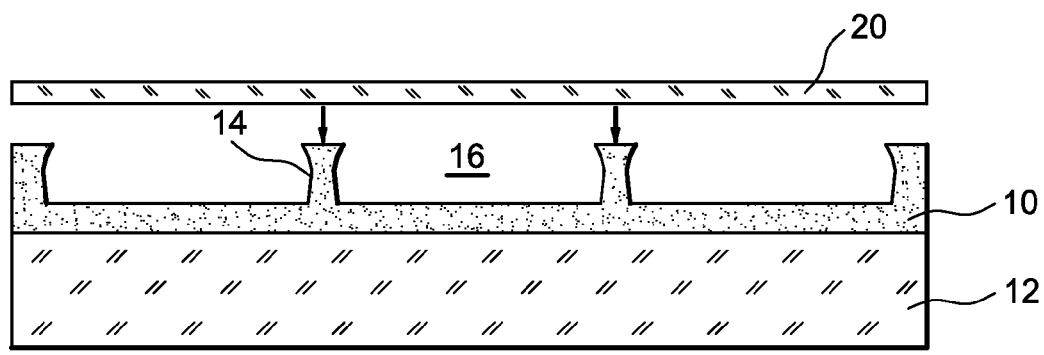

In an optional step, the masking layer 6 may then be eliminated, for example by plasma etching or chemical etching: FIG. 3C. A component is thereby obtained, of which one of the faces is of homogeneous nature but has the surface irregularities that are the walls 14.

The cavities 16 thereby obtained may be filled with a suitable fluid 18 and sealed by depositing another layer of transparent material 20 above, for example by laminating: a film 22 according to the invention is thereby obtained, the optical properties of which are optimised and comprise leak tight cavities 16 in which the fluid 18 of selected optical properties is placed: FIG. 3C. The cavities 16 may be filled by any appropriate method, for example by dipping, spreading by spin coater or doctor blade, serigraphy, or any other printing technique.

Figure 3D:
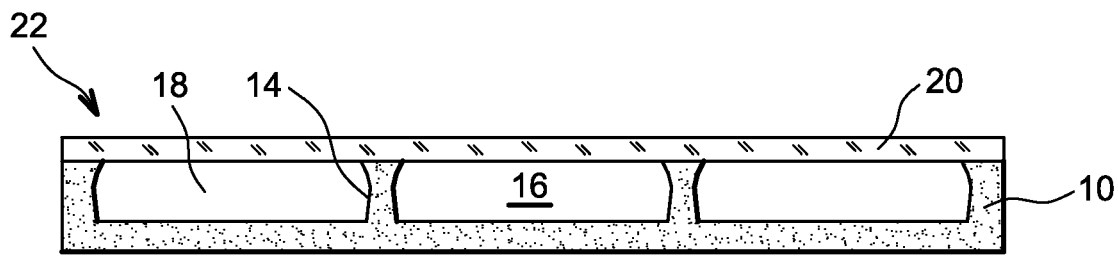

To optimise the film 22 according to the invention, it is then possible to dissociate the layer 10 from the substrate 12, in particular if the substrate 12 does not have the desired optical qualities or to reproduce the dimensional or flexibility characteristics of the film 10: FIG. 3D. The dissociation may take place for example by mechanical action (traction, shearing forces, insertion of a blade, etc) and/or chemical action.

For example, for this first embodiment, a flexible transparent film 10 is selected, of PET (Poly Ethylene Terephthalate) type, of 75 μm thickness, and it is coated with a layer of acrylic type adhesive. The film 10 is then laminated on a silicon wafer 12 or a glass slate.

A layer of titanium 2 of around 50 nm is deposited by sputtering or evaporation, then the walls are defined by photolithography by means of a conventional thin film resin 4 enabling small size patterns 6 to be defined (around 2 μm), for example a square mesh of pitch of around 10 to 100 μm, or a random mesh in order to minimise the optical effects associated with a too regular arrangement. An RIE plasma etching is then carried out, with $SF_6$ under 10 mTorr and 350 W, of the layer of titanium 2 not protected by the resin 4, then by RIE plasma etching with $O_2$ of the polymer layer 10 over a thickness of around 10 μm. The concavity obtained has a deflection of the order of the micron.

Figure 4:
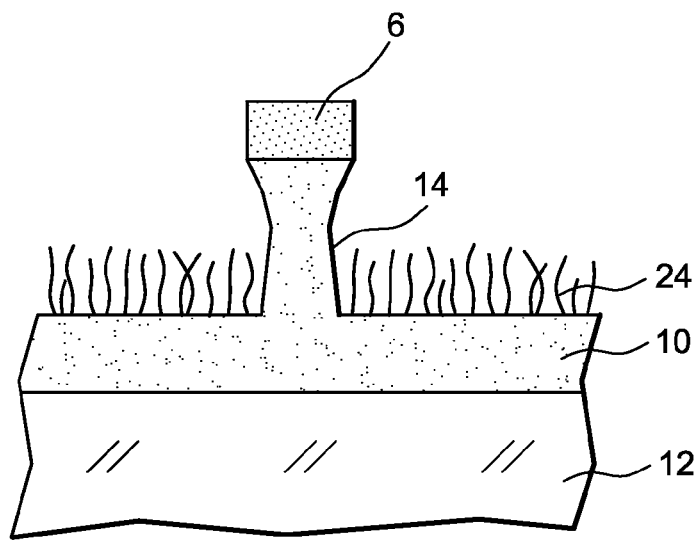
FIG. 4 schematises the formation of "grasses" by an etching used according to the invention.

Depending on the considered material 10, it may be that its plasma etching generates filaments on the base of the cavity 18, also known under the name "grass formation": see FIG. 4. In fact, this grass 24 may be bothersome for certain applications and certain fluids. According to one embodiment of the invention, it is proposed to deposit a thin film in what will be the cavity base 16, which will be etched preferentially by chemical route, so as to eliminate this grass 24.

This layer may also be advantageously used as stop layer during the plasma etching. Thus, it is easier to control the depth of the cavities. According to a second preferred embodiment, the walls are thus transferred onto a flat transparent film 30; they may or not have the same composition as the base 30.

Figure 5A:
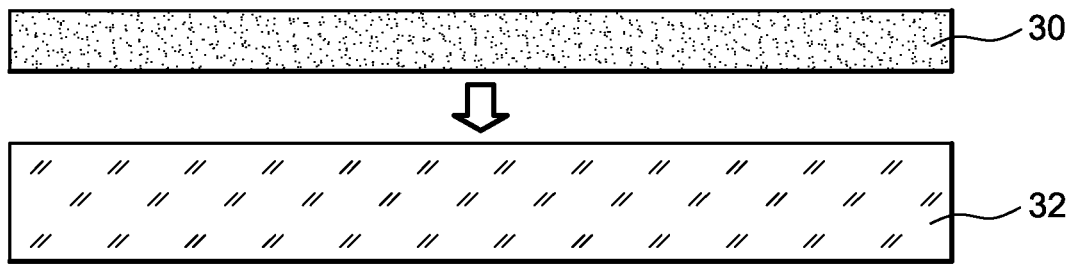
FIGS. 5A to 5G show another preferred embodiment of the method according to the invention.

In a manner similar to the first embodiment, a transfer is firstly (FIG. 5A) carried out, by bonding, of the transparent film 30 onto a support or substrate 32 that can be treated by lithography and dry etching equipment. The support 32 is for example glass, or silicon, or quartz, or polymer.

Figure 5B:
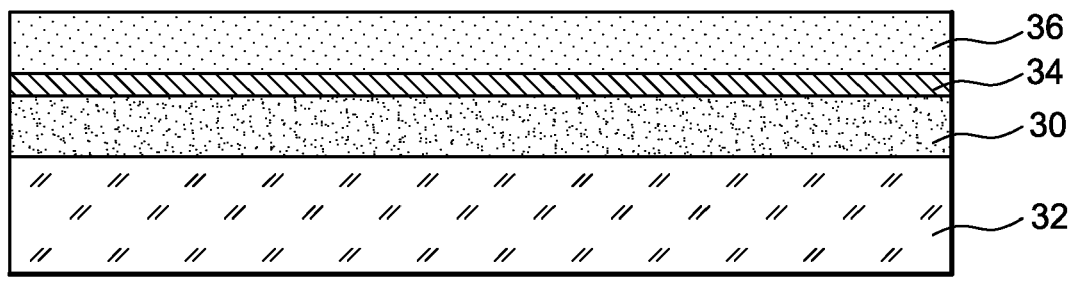

A deposition (FIG. 5B) of a layer 34 serving as both stop to the plasma etching and to removal of the grass 24 is then carried out. A selective material is chosen for this layer 34 in comparison to the plasma etching of the walls, for example a metal (Al, Ti, Cr, etc.) or an alloy (Al/Si, Al/Cu, etc.) or a transparent layer in $SiO_2$, or $SiO_x$, or SiOC, or SiN, or ITO. This material 34 has for example a thickness between 0.05 μm and 2 μm, and may be put in place by chemical vapour deposition (CVD), or sputtering, or evaporation.

The layer 36 in which the walls will be etched is then deposited: it is a polymer material of suitable optical index or absorbing visible radiation, of typical thickness between 1 μm and 30 μm, deposited by spin coater, or in the form of spray, or dry film, or by spread coating.

Figure 5C:
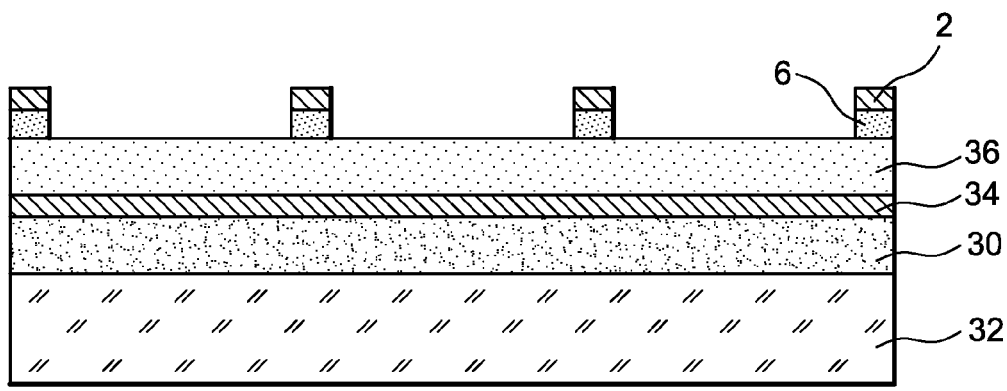

A mask 6 is then deposited, as for the first embodiment. In FIG. 5C is represented a mask stemming from the method as illustrated in FIG. 2, with residue of resin 2 above the patterns of the mask 6.

Figure 5D:
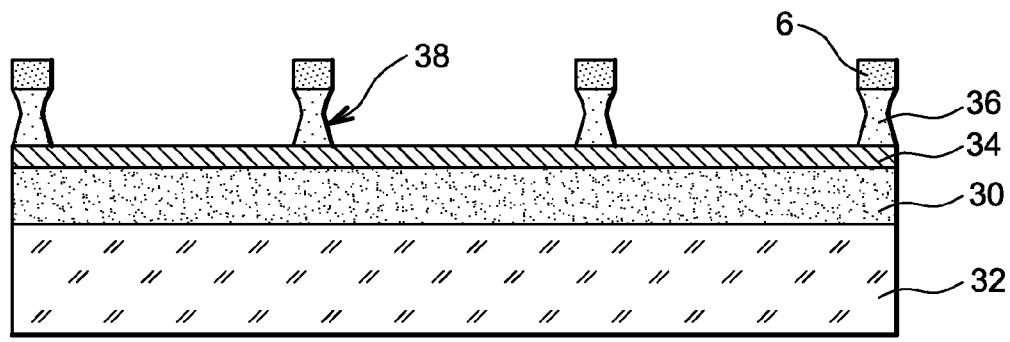

A plasma etching of the layer 36 then enables the walls 38 to be formed, by conventional RIE or high density plasma etching, with $O_2$ mixed or not with a $SF_6$ and/or $CHF_3$ type fluorinated gas under suitable conditions in proportion and in pressure to have a slight isotropy. During this step, the mask of resin 2 will itself also be eliminated (FIG. 5D). Here, the etching continues up to the stop layer 34. In the same way as for the first embodiment, the curved shape of the walls 38 obtained depend on the parameters chosen for the plasma etching.

Figure 5E:
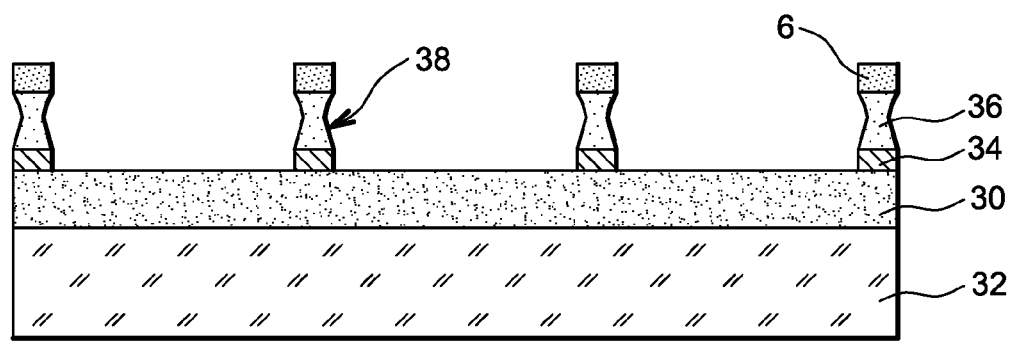

If the stop layer 34 is not transparent and/or if grasses are present, the stop layer 34 may be removed, by plasma etching or chemical etching (FIG. 5E). An etching of the masking layer 6 may also be carried out, for example by plasma etching or by chemical etching. It should be noted that the depth of the cavities is then equal to the thickness of the layer 36, increased if necessary by that of the stop layer 34, and therefore better controlled.

Figure 5F:
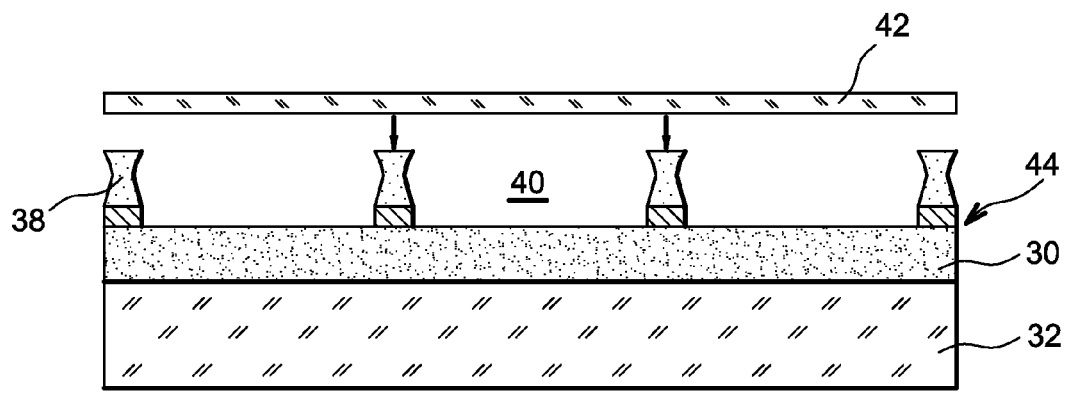

In the same way as for the first embodiment, the cavities 40 may then be filled and sealed by laminating another transparent film 42 above (FIG. 5F); the device obtained may be separated from the substrate 32.

Figure 5G:
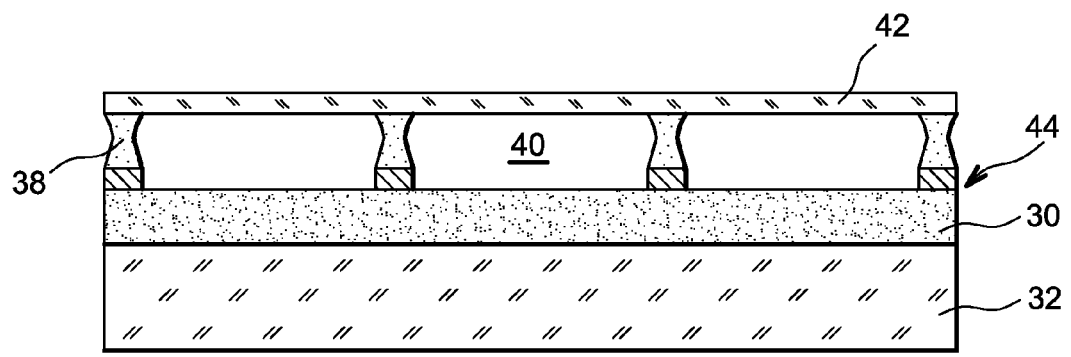

For example, to manufacture a film 44 according to FIG. 5G, a flexible, transparent, PET type film 30 of 75 μm thickness is selected, coated with a layer of acrylic type adhesive, for example of 25 μm thickness, then laminated on a silicon wafer 32 or a glass slate. A layer 34 of SiOx or SiOC, of around 50 nm is then deposited by Plasma Enhanced Chemical Vapour Deposition (PECVD) or by evaporation.

A polymer 36 of suitable index, of thickness of around 5 to 10 μm, is deposited by spin coater, then a mask 6 is formed as described previously (sputtering or evaporation of a layer 2 of titanium of around 50 nm, definition of the pattern 6 by photolithography by means of a conventional thin resin 4, etching by RIE plasma with $SF_6$ of the layer 4 of titanium not protected by the resin 2).

Then, still by RIE plasma but with $O_2$ (for example 50 mTorr and at 350 W), the polymer layer 36 is etched; the etching stops on the layer 34 of SiOx or SiOC, which is chemically etched with a buffered hydrofluoric solution such as BOE. The metal 6, present on the walls 38 of the cavities, may be etched by chemical route, with for example diluted HF.

The cavities 40 are filled by depositing a drop of photochromic liquid on the substrate 30 and by spreading with a scraper. The cavities 40 are then sealed by laminating above a pre-bonded film 42 of PET.

Obviously, these methods of formation are only given by way of indication, and the different selections performed may be combined together to also form part of a method or a device according to the invention.

The invention claimed is:

1. Optical device comprising a first layer of material, a second layer of material and walls delimiting cavities between the first and second layers of material, the walls having a pair of ends and a center portion between the ends,
the walls having a biconcave structured shape so that the thickness of the ends of the walls, adjacent to the first and second layers, is greater than the thickness of the center portion of the walls,
further comprising at least a portion of a stop layer interposed between one of the ends of the walls and one of the first and second layers of material,
wherein the walls are formed of a different material than said portion of a stop layer, and
wherein the wall material is configured to be etched by plasma while the portion of a stop layer is substantially impervious to being etched by said plasma.

2. Device according to claim 1 wherein the first and the second layers are transparent, and the cavities form a leak tight assembly filled with a fluid of predetermined optical qualities.

3. Device according to claim 2 wherein the fluid is photosensitive, heat sensitive, or a liquid of determined optical index.

4. Device according to claim 1 wherein the walls comprise a transparent or light absorbing part adjacent to one of the first and second layers.

5. Device according to claim 1 wherein the walls have a height H extending between the ends, a thickness l at each of the ends, and a thickness e at the center portion, and
wherein a ratio of the thickness l and the thickness e of the walls is within the range of $l/10 \leq e \leq l/2$.

6. Device according to claim 1 wherein the walls have a height H extending between the ends, a thickness l at each of the ends, and a thickness e at the center portion, and
wherein a ratio of the height H and the thickness l of the walls is within the range of $2 \leq H/l \leq 10$.

7. Device according to claim 1 wherein said portion of a stop layer extends substantially along a major portion of one of the first and second layers of material.

8. Device according to claim 1 wherein the portion of a stop layer is configured to be at least partially etched by another plasma that is different than said plasma used to etch said wall material.

* * * * *